United States Patent
Spies et al.

(10) Patent No.: US 10,659,468 B2
(45) Date of Patent: May 19, 2020

(54) ACCESS CONTROL VALUES

(71) Applicant: EntIT Software LLC, Sunnyvale, CA (US)

(72) Inventors: Terence Spies, Sunnyvale, CA (US); Saurabh Sashte, Sunnyvale, CA (US)

(73) Assignee: MICRO FOCUS LLC, Santa Clara, CA (US)

(*) Notice: Subject to any disclaimer, the term of this patent is extended or adjusted under 35 U.S.C. 154(b) by 267 days.

(21) Appl. No.: 15/603,675

(22) Filed: May 24, 2017

(65) Prior Publication Data
US 2018/0343258 A1 Nov. 29, 2018

(51) Int. Cl.
*H04L 29/06* (2006.01)
*H04L 9/08* (2006.01)
*H04L 9/06* (2006.01)

(52) U.S. Cl.
CPC .......... *H04L 63/101* (2013.01); *H04L 9/0643* (2013.01); *H04L 9/0822* (2013.01); *H04L 9/0891* (2013.01); *H04L 63/0435* (2013.01); *H04L 63/061* (2013.01); *H04L 63/102* (2013.01); *H04L 63/123* (2013.01)

(58) Field of Classification Search
CPC ........... H04L 63/10–108; H04L 63/061; H04L 63/123; H04L 9/0643; H04L 9/0822; H04L 9/089; G06F 21/10–14; G06F 21/60–629; G06F 21/86–87
See application file for complete search history.

(56) References Cited

U.S. PATENT DOCUMENTS

| | | | |
|---|---|---|---|
| 7,376,835 B2 | 5/2008 | Olkin et al. | |
| 7,743,249 B1 | 6/2010 | Zucker et al. | |
| 7,797,543 B1* | 9/2010 | Campbell | H04L 63/08 713/176 |
| 8,239,682 B2 | 8/2012 | Meehan et al. | |
| 10,033,703 B1* | 7/2018 | Sharifi Mehr | H04L 9/14 |
| 2008/0071867 A1* | 3/2008 | Pearson | G06Q 10/107 709/206 |
| 2008/0086646 A1* | 4/2008 | Pizano | H04L 9/3231 713/189 |
| 2008/0275957 A1* | 11/2008 | Pouzin | G06Q 10/107 709/206 |
| 2013/0219176 A1* | 8/2013 | Akella | H04L 63/0815 713/165 |

(Continued)

OTHER PUBLICATIONS

Wikipedia, ID-based encryption last modified Feb. 21, 2017 (6 pages).

(Continued)

*Primary Examiner* — Meng Li
*Assistant Examiner* — Shaqueal D Wade

(57) ABSTRACT

In some examples, a system receives, from a sender, an access control value generated based on information of a plurality of recipients. The system sends, to the sender, a signed version of the access control value for sending by the sender to the plurality of recipients with an encrypted message. The system receives, from a first recipient a request for a key to decrypt the encrypted message, a signed access control value and recipient information for deriving the access control value. The system determines whether the first recipient is one of the plurality of recipients using the signed access control value and the recipient information.

16 Claims, 7 Drawing Sheets

(56) References Cited

U.S. PATENT DOCUMENTS

2018/0227129 A1* 8/2018 Campagna ............ H04L 9/3247

OTHER PUBLICATIONS

Wikipedia, Key derivation function last modified Apr. 10, 2017 (6 pages).
Wikipedia, Message authentication code last modified Mar. 18, 2017 (8 pages).
www.tutorialspoint.com—Message Authentication dated on or before Apr. 17, 2017 (3 pages).
Wikipedia, Session key last modfiied Feb. 1, 2017 (2 pages).
Wikipedia, Transport Layer Security last modified Apr. 19, 2017 (24 pages).
Attrapadung et al., Broadcast Encryption with Short Keys and Transmissions, Oct. 2003 (12 pages).
Hatano et al., Study on Encryption Method in Group Communication Using Rsa Accumulator, Oct. 17-19, 2007 (6 pages).

* cited by examiner

ACCESS CONTROL VALUES

BACKGROUND

Communications between different entities (where entities can refer to users, programs, and/or machines) can contain sensitive information that is to be protected. Examples of sensitive information include personal information of a user, confidential information, information pertaining to a system, a program, or a machine that an enterprise may not wish to be exposed, and so forth. Encryption techniques can be applied to protect communications.

BRIEF DESCRIPTION OF THE DRAWINGS

Some implementations of the present disclosure are described with respect to the following figures.

Figure 1:
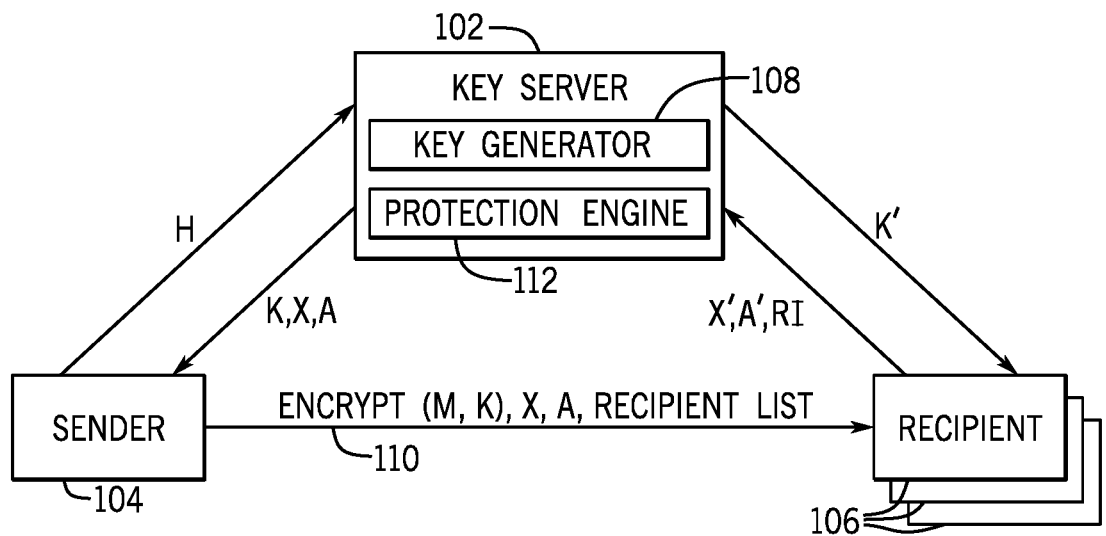
FIG. 1 is a block diagram of an arrangement that includes a key server, a sender, and recipients, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A message sent by a sender to a recipient may be intercepted or otherwise accessed by an unauthorized entity, such as a machine, a program, or a user. A "message" can refer to any data that can be communicated between different entities. A "sender" can refer to an entity that sends a message, where an entity can refer to a machine, a program, or a person. A recipient refers to an entity that receives a message, where such entity can be a machine, a program, or a person. A program can refer to machine-readable instructions, such as software or firmware.

To reduce the likelihood of unauthorized access of a message sent by a sender to a recipient, encryption of the message can be performed. In some cases, symmetric encryption can be applied to protect messages. Symmetric encryption involves the use of a symmetric key. The symmetric key is used by the sender to encrypt a message, and is used by a recipient to decrypt a message. In some examples, session keys can be used as symmetric keys. A session key can refer to a single-use key that is used by a sender and a recipient during a given communication session between the sender and the recipient. Once the communication session is finished, the session key is discarded and no longer used by the sender and the recipient. A "communication session" can refer to any interaction between entities in which information is exchanged between the entities.

In some examples, a session key can be generated by a key server, and the session key can be provided by the key server to the sender and the recipient. To provide a session key from the key server to recipients (of a message from a sender) in a secure manner, the key server can encrypt the session key, and send an encrypted version of the session key to each of the recipients. An encrypted version of a session key can be referred to as an "encrypted session key." For example, the key server can encrypt a session key using a public key of each of the recipients (where different recipients can have different public keys). As a result, multiple encrypted versions of the session key (i.e., multiple encrypted session keys) are provided by the key server to respective recipients to allow for encryption of an encrypted message.

In the foregoing examples, the number of encrypted session keys can be proportional (e.g., equal) to the number of recipients. If there are a large number of recipients, then there can be a large number of encrypted session keys. Moreover, different communication sessions between different senders and different sets of recipients use different session keys, which further leads to use of a large number of encrypted session keys. The transmission of a large number of encrypted session keys consumes substantial network bandwidth.

In accordance with some implementations of the present disclosure, a number of keys (e.g., session keys) used to protect messages sent from a sender to multiple recipients can be independent of the number of recipients.

FIG. 1 shows an example arrangement that includes a key server 102 used to protect communications from a sender 104 to recipients 106. FIG. 1 shows an example where specific pieces of information are exchanged among the various nodes, including the key server 102, a sender 104, and the recipients 106. It is noted that in other examples, additional or alternative pieces of information can be exchanged among the key server 102, a sender 104, and the recipients 106. Also, although FIG. 1 shows just one sender 104, further examples can include multiple senders each capable of sending a message to a respective group of recipient(s).

The key server 102 can be implemented with a computer or multiple computers. The key server 102 can be coupled to a network, and can communicate with senders and recipients over the network. In some examples, communications between the key server 102 and the sender 104 and recipients 106 over the network can be protected by a cryptographic security mechanism, such as a security mechanism according to the Transport Layer Security (TLS) protocol, a Secure Socket Layer (SSL) mechanism, or any other type of protocol. The security protocol is used to protect information exchanged between the key server 102 and senders and recipients.

The sender 104 in some examples can include a sender device, and the recipients 106 in some examples can include recipient devices. A "device" can refer to an electronic device, such as a desktop computer, a notebook computer, a tablet computer, a smartphone, a wearable device (e.g., a smart watch, smart eyeglasses, a head-mounted device, etc.), a game appliance, a vehicle, a household appliance, a server computer, a communication node (e.g., a switch, a router, a gateway, etc.), or any other type of electronic device.

In other examples, the sender 104 and the recipients 106 can include programs or humans.

The key server 102 includes a key generator 108 to generate a key K, such as a symmetric key, which can be used by the sender 104 to encrypt a message and a recipient 106 to decrypt an encrypted message. In more specific examples, the key generated by the key generator 108 can be a session key.

As shown in FIG. 1, the sender 104 sends (at 110) a message M that is encrypted with the key K to the recipients 106. In addition, the sender 104 can send other information to the recipients 106 with the encrypted message, as discussed further below.

The key server 102 also includes a protection engine 112 that is used to produce a signed access control value A, authenticate the recipients 106, and to verify that the recipients 106 are allowed access to an encrypted message prior to the key server 102 providing a key K' to the recipients. Note that the key K' is identical to the key K if a recipient requesting a key from the key server 102 provides expected information (discussed further below) with the request for a key. The designation K' is provided to distinguish the version of the key sent to a recipient 106 from the key K sent to the sender 104.

Each of the key generator 108 and the protection engine 112 can be implemented as a hardware processing circuit, or as a combination of a hardware processing circuit and machine-readable instructions executable on the hardware processing circuit. As examples, the hardware processing circuit can include any or some combination of the following: a microprocessor, a core of a multi-core microprocessor, a microcontroller, a programmable gate array, a programmable integrated circuit device, or any other type of hardware processing circuit.

As shown in FIG. 1, to request a key from the key server 102, the sender 104 sends an access control value H to the key server 102. As used here, an "access control value" can refer to any information that is used to control access to a message. In some examples, the access control value H is derived by the sender 104 (or by another entity) based on information of the recipients 106. For example, the access control value H can be derived based on identities of the recipients 106. An identity of a recipient can refer to any information that identifies a recipient or otherwise distinguishes one recipient from another recipient. Examples of recipient identities include any or some combination of the following: a network address (e.g., Internet Protocol or IP address, Ethernet address, etc.) assigned to a recipient, a name of a recipient, a telephone number of a recipient, or any other type of identifier. As discussed further below, the access control value H can be calculated by applying hash functions on the information of the recipients 106 (such as the identities of the recipients 106). In other examples, the access control value can be derived based on other information of the recipients 106.

In response to the access control value H received from the sender 104, the protection engine 112 generates a signed access control value A. The signed access control value A is produced by applying a signing function, such as the Message Authentication Code (MAC) function, to a value that includes or is based on the access control value H. The MAC function includes a key generation algorithm that selects a key from a collection of keys at random, a signing algorithm to produce a tag given the key and the access control value H (the selected key can be used to encrypt a value that includes or is based on the access control value H), and a verifying algorithm to verify the authenticity of an access control value H given the key and the tag.

In other examples, other types of signing functions can be employed. A signing function generally refers to a function that receives an input (such as the access control value H) and produces an output (the signed access control value A), where the signed access control value A can be used to authenticate the access control value H (in other words, to confirm that a piece of information came from the stated sender).

In some examples, the protection engine 112 can further produce a message identifier X, which is the identifier that is to be used for the message M that is to be sent by the sender 104. A message identifier can refer to any information that can be used to identify a message.

The key server 102 sends the following information to the sender 104: the key K generated by the key generator 108, the message identifier X, and the signed access control value A.

The key K received by the sender 104 from the key server 102 is used by the sender 104 to encrypt the message M that is sent by the sender 104 (at 110) to the recipients 106. In addition to the encrypted message M that is encrypted with the key K, the sender 104 in some examples can also send the following pieces of information: the message identifier X (received from the key server 102), the signed access control value A (received from the key server 102), and a recipient list (which includes a list of recipients, or more specifically, the identities of the recipients 106). Note that the recipient list can be included in a portion of the message, such as a header of the message. The portion of the message including the recipient list may be unencrypted. The unencrypted portion of the message can further include the message identifier X and the signed access control value A. A portion of the message M that is encrypted with the key K can be the payload of the message M, which is used to carry sensitive information or any other information that is to be protected.

In some examples, the message M can be an e-mail message, and the recipient list can include email addresses of the intended recipients. In other examples, the message M can be a different type of message.

Upon receiving the encrypted message (M encrypted with K) from the sender 104, a given recipient 106 requests a key from the key server 102 to decrypt the received encrypted message. To do so, the given recipient 106 sends the following information to the key server 102: a message identifier X', a signed access control value A', and recipient information RI. The information X', A', and RI can be sent by the given recipient 106 to the key server 102 in association with a request for a key. Such information can be included in the request for the key, or can be sent separately from the request for the key.

The recipient information RI can be used by the key server 102 to reproduce the access control value H (assuming that the given recipient 106 is an authenticated recipient, i.e., a recipient that is one of the intended recipients of the recipient list). In some examples, the recipient information RI can include an identity of a recipient (or multiple identities of recipients) and can include an intermediate access control value (or multiple intermediate access control values), as explained further below. Effectively, due to the use of hash values derived from identities of recipients, the recipient information RI sent to the key server 102 is a compressed recipient list (a partial recipient list), since the recipient information RI includes just some recipient identities (not all recipient identities in the recipient list), along with intermediate access control value(s).

If the given recipient 106 is an intended recipient (i.e., a recipient in the recipient list), then the message identifier X' and the signed access control value A' would be the same as X and A, respectively, received from the sender 104. However, if the given recipient 106 is not an intended recipient, or if there was some error in receiving information from the sender 104, then X' and/or A' may not be the same as X and/or A received from the sender 104. Moreover, in such a scenario, the recipient information RI may not produce the access control value H at the key server 102.

In response to X', A', and RI from the given recipient 106, the protection engine 112 is able to: (1) verify that the identity of the given recipient 106 belongs to the given recipient 106, and (2) if the verification is successful, use the recipient information RI along with other computed values to compute an access control value $H_C$. The protection engine 112 then signs the computed access control value $H_C$, by applying the signing function f3 to a value that includes or is based on $H_C$, to produce a signed computed access control value $A_C$. The protection engine 112 then compares the signed computed access control value $A_C$ with the received signed access control value A' from the given recipient 106. If $A_C$ matches A', then the protection engine 112 provides a match indication to the key generator 108, which returns the session key K' to the given recipient 106, for use by the given recipient 106 to decrypt the encrypted message received from the sender 104.

Figure 2:
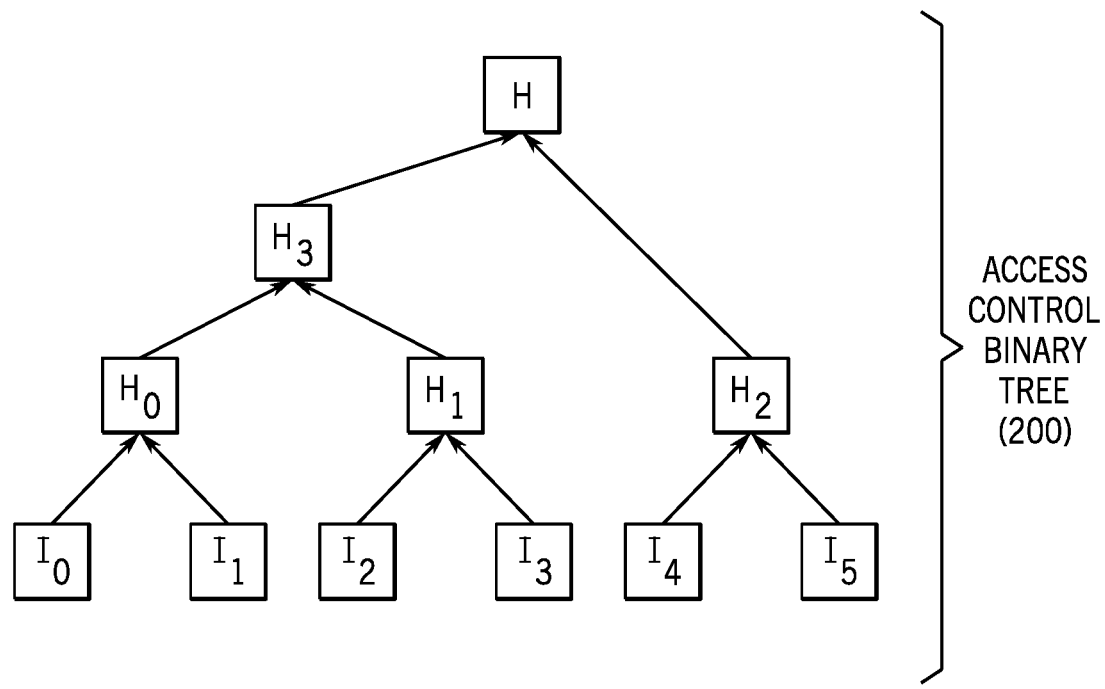
FIG. 2 is a graph showing an access control binary tree for computing an access control value according to some examples.

FIG. 2 illustrates an example of how the access control value H can be derived (by the sender 104 or another entity) based on identities of recipients. The identities of the recipients include $I_0$, $I_1$, $I_2$, $I_3$, $I_4$, and $I_5$ in the example. It is assumed that the identity $I_0$ is the identity of the sender 104, while the identities $I_1$-$I_5$ are the identities of five respective recipients 106 that receive an encrypted message from the sender 104. In the present example, the sender itself can be considered a recipient for purposes of computing the access control value H.

Although a specific number of recipients is depicted in FIG. 2, it is noted that in other examples, a different number of recipients can be used.

FIG. 2 depicts an example access control binary tree 200 that includes a hierarchical arrangement of nodes. The leaf nodes of the access control binary tree 200 represent the identities $I_0$, $I_1$, $I_2$, $I_3$, $I_4$, and $I_5$, the root node of the access control binary tree 200 represents the access control value H, and the intermediate nodes (nodes between the leaf nodes and root node) are intermediate access control values computed using respective hashing functions.

Although FIG. 2 shows an example access control binary tree 200 for producing the access control value H from identities of recipients (including the sender 104 and the recipients 106), in other examples, other techniques for computing the access control value H given identities of the sender 104 and the recipients 106 can be employed, based on a different representation of an access control relationship that specifies how the access control value H is derived given a list of identities or other information of recipients.

In the access control binary tree 200, intermediate access control values $H_0$, $H_1$, $H_2$, and $H_3$ are produced for deriving the access control value H. The access control value $H_0$ is calculated based on the identities $I_0$ and $I_1$, the intermediate access control value $H_1$ is calculated based on $I_2$ and $I_3$, the intermediate access control value $H_2$ is calculated based on $I_4$ and $I_5$, and the intermediate access control value $H_3$ is calculated based on $H_0$ and $H_1$. The access control value H is calculated based on $H_3$ and $H_2$.

More generally, each calculated access control value (which can be an intermediate access control value or the access control value H) is computed based on two values below the respective access control value in the access control binary tree 200.

In some examples, a hash function can be applied on lower level values in the access control binary tree 200 to produce the respective calculated access control value in the access control binary tree 200.

In some examples, a hash function that can be applied to compute a calculated access control value in the access control binary tree 200 can include a Secure Hash Algorithm (SHA) function, which is a cryptographic hash function. An example of a SHA function is a SHA-256 function. In other examples, other SHA functions can be employed, or other types of hash functions can be applied. More generally, a hash function can refer to a function that can be used to map data of arbitrary sizes to data of a fixed size, where a value returned by a hash function is called a hash value (or hash code or simply hash).

Thus, in the example of FIG. 2, $H_0$ is computed by applying a hash function on $I_0$ and $I_1$, $H_3$ is computed by applying a hash function on $H_0$ and $H_1$, and the access control value H is computed by applying a hash function on $H_3$ and $H_2$, and so forth. Note that the same hash function can be used to calculate each of the calculated access control values, or alternatively, different hash functions can be used to calculate respective different calculated access control values.

Key Request for Message Encryption

Figure 3:
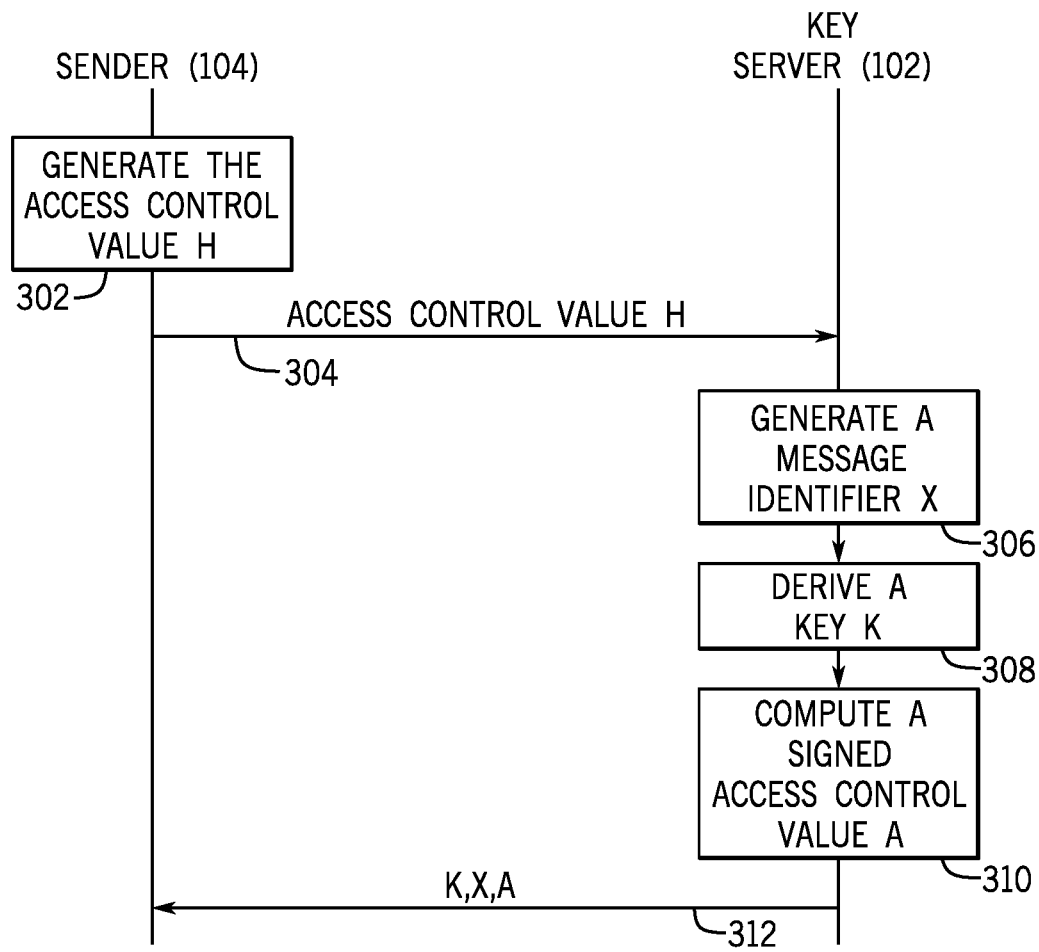
FIG. 3 is a flow diagram of a process of obtaining a key to encrypt a message by a sender, according to some examples.

FIG. 3 shows operations of the sender 104 and key server 106 relating to a request for a key sent by the key server 102. It is assumed that the sender 104 has a sorted set of identities $\{I_0, I_1, \ldots, I_{R-1}\}$, where R is the number of recipients (including the sender 104 and the recipients 106). The sorted set of identities can be represented by leaf nodes of the access control binary tree 200 of FIG. 2, for example, or by another representation.

The sender 104 generates (at 302) the access control value H, based on the set of identities $\{I_0, I_1, \ldots, I_{R-1}\}$ and the access control binary tree 200 or other access control relationship representation, such as by using a hash function f1 to produce calculated access control values as discussed above.

The sender 104 sends (at 304) the access control value H to the key server 102. The access control value H can be sent in association with a request for a key (a "key request") from the sender 104, where the access control value H can be included in the key request or can be sent separately from the key request.

In response to the access control value H, the protection engine 112 in the key server 102 generates (at 306) a message identifier X. The generated message identifier X can be any unique value that can be assigned to a specific message. For example, in response to successive key requests, the protection engine 112 can increment a counter that produces the next message identifier.

The key generator 108 in the key server 102 derives (at 308) the key K as follows: K=f2(X, S), where S is a secret maintained by the key server 102, and f2 is a key derivation function. The secret S can be a master key of the key server 102, a password, or any other confidential information that is kept confidential at the key server 102 (i.e., unknown to unauthorized entities). The key function f2 is applied on input values X (the message identifier) and S (the secret) to compute the key K.

The protection engine 112 computes (at 310) a signed access control value A as follows: A=f3(H, X, S), where f3 is a signing function (e.g., a MAC function) that computes the signed access control value A given the following inputs: the access control value H, the message identifier X, and the secret S.

The key server 102 sends (at 312) K, X, and A to the sender 104, as part or in association with a response to the key request sent by the sender 104. The key K can be used by the sender 104 to encrypt a message M, and the sender 104 can send the encrypted message along with X and A to a group of recipients, such as 106 in FIG. 1.

Key Request for Message Decryption

Figure 4:
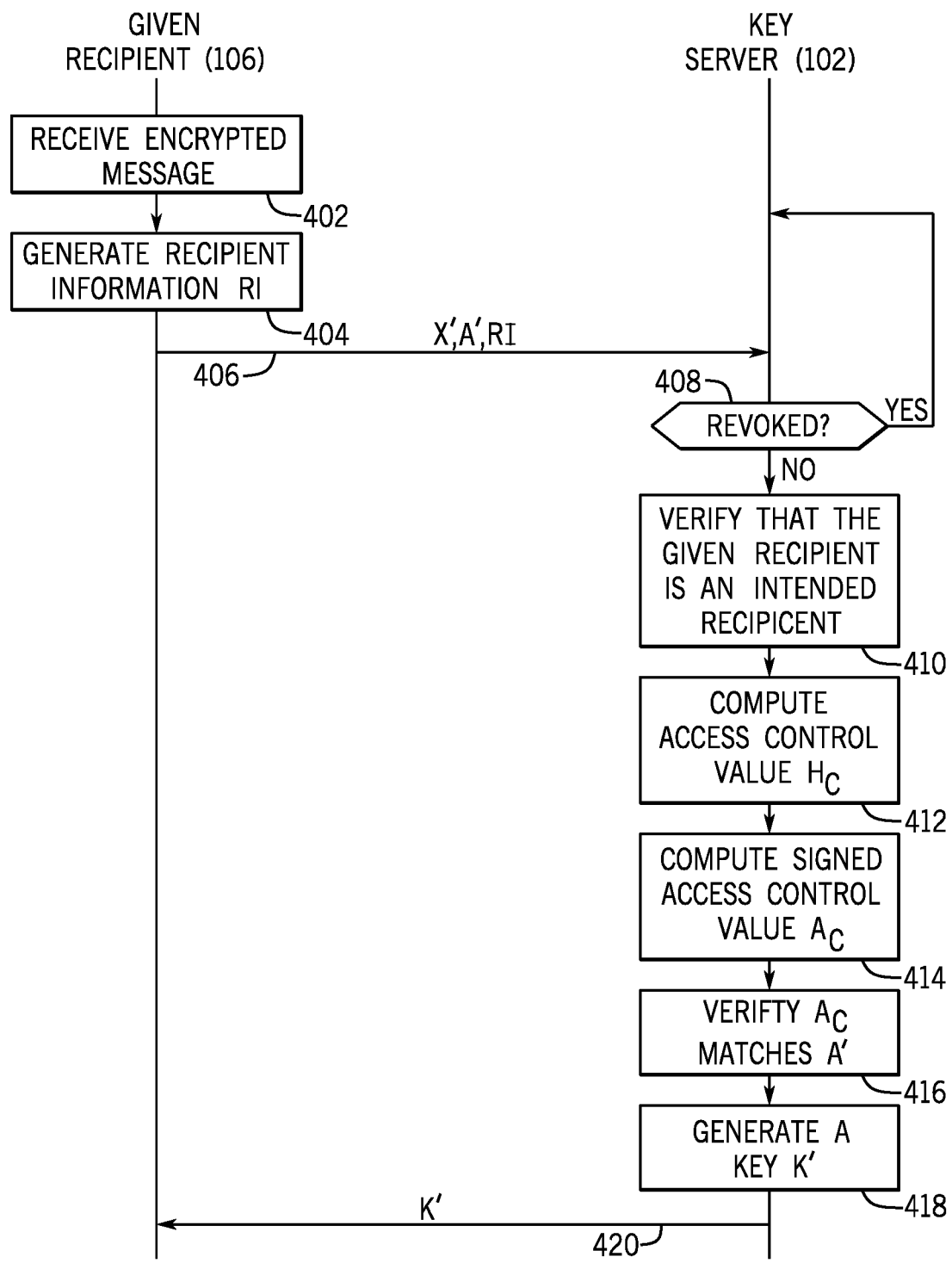
FIG. 4 is a flow diagram of a process of obtaining a key to decrypt an encrypted message by a recipient, according to further examples.

FIG. 4 shows operations performed by a given recipient 106 and the key server 102 relating to a key request sent by the given recipient 106 in response to receiving an encrypted message from the sender 104, according to some examples.

The process of FIG. 4 can be performed by each of the recipients 106 in response to receiving an encrypted message from the sender 104.

The given recipient 106 receives (at 402) an encrypted message, ENCRYPT(M, K) in FIG. 1, along with other information as shown in FIG. 1, such as the message identifier X, the signed access control value A, and the recipient list.

The given recipient 106 generates (at 404) the recipient information RI, which includes the identity of the given recipient 106 and an intermediate access control value. Assuming that the given recipient 106 is assigned identity $I_2$, then the recipient information RI generated by the given recipient 106 includes the following: identity $I_2$ of the given recipient 106, identity $I_3$ of another recipient 106, and computed intermediate access control values $H_0$ and $H_2$. Note that the given recipient 106 can skip calculating $H_1$ (which is derived from identities $I_2$ and $I_3$), since the key server 102 would be able to generate $H_1$ at the key server 102 based on $I_2$ and $I_3$ in the recipient information RI received from the given recipient 106. Also, the given recipient 106 can skip calculating $H_3$, since the key server 102 would be able to generate $H_3$ at the key server 102 based on $H_0$ and $H_1$ in the recipient information RI. Additionally, the given recipient 106 can skip calculating H, since the key server 102 would be able to generate H at the key server 102 based on $H_0$, $H_2$, $I_2$, and $I_3$ in the recipient information RI.

Effectively, the given recipient 106 sends the minimal information to the key server 102 that the key server 102 can use to compute the access control value H. This helps reduce the amount of network traffic between the key server 102 and recipients.

The given recipient 106 then sends (at 406) the following to the key server 102 in association with a key request: message identifier X', signed access control value A', and the recipient information RI, which in this example includes $\{H_0, I_2, I_3, H_2\}$.

The key server 102 determines (at 408) if the message identified by the message identifier X' has been revoked, either for all recipients or for a subset of recipient(s) including the given recipient 106. If the message has been revoked, then the key server 102 rejects the key request and returns to an initial state. The key server 102 can send a response back to the given recipient 106 indicating the rejection of the key request sent by the given recipient 106.

However, if the message has not been revoked for the given recipient 106, then the protection engine 112 verifies (at 410) that the given recipient 106 is an intended recipient, by ensuring that the given recipient 106 is authenticated and in the recipient list. If verified, then the process can continue; otherwise, the key request can be rejected by the key server 102.

The protection engine 112 computes (at 412) an access control value $H_C$ based on the received recipient information RI, which includes $\{H_0, I_2, I_3, H_2\}$, by using the hashing function f1 (which was also used by the sender 104 to produce the access control value H).

The protection engine 112 then computes (at 414) a signed access control value $A_C$ based on $H_C$ as follows: $A_C$=f3($H_C$, X', S). The protection engine 112 verifies (at 416) that the computed signed access control value $A_C$ matches the received signed access control value A' (from the given recipient device 106), by comparing $A_C$ to A'. If $A_C$ matches A', then that is an indication that the given recipient 106 is authorized to access the encrypted message.

Assuming that $A_C$ matches A', the protection engine 112 provides a match indication to the key generator 108, which generates (at 418) a key K' as follows: K'=f1(X', S). If $A_C$ does not match A', then the key request is rejected.

The key server 102 sends (at 420) the key K' to the given recipient 106, in association with a response to the key request from the given recipient 106.

Message Revocation

Access to encrypted messages can be further managed by restricting or revoking the access based on specified criteria like the message subject, date, and so forth. Based on the specified criteria, the message revocation can be performed by either by a sender or by an administrator of the key server 102. In some examples, to support the ability to revoke messages, the messages are encrypted using symmetric key encryption and not public key encryption.

The sender 104 can send a request to the key server 102 to revoke a message. Revoking a message refers to revoking access to the message for a recipient or multiple recipients. In response to the message revocation request, the key server 102 uses information received from the sender 104 to authenticate the sender 104, and to further verify that sender information sent by the sender 104 to the key server 102 indicates that the sender 104 is authorized to perform the revocation. Such sender information is similar to the recipient information discussed above that is sent by a recipient to the key server 102 to request a key for decrypting an encrypted message.

Figure 5:
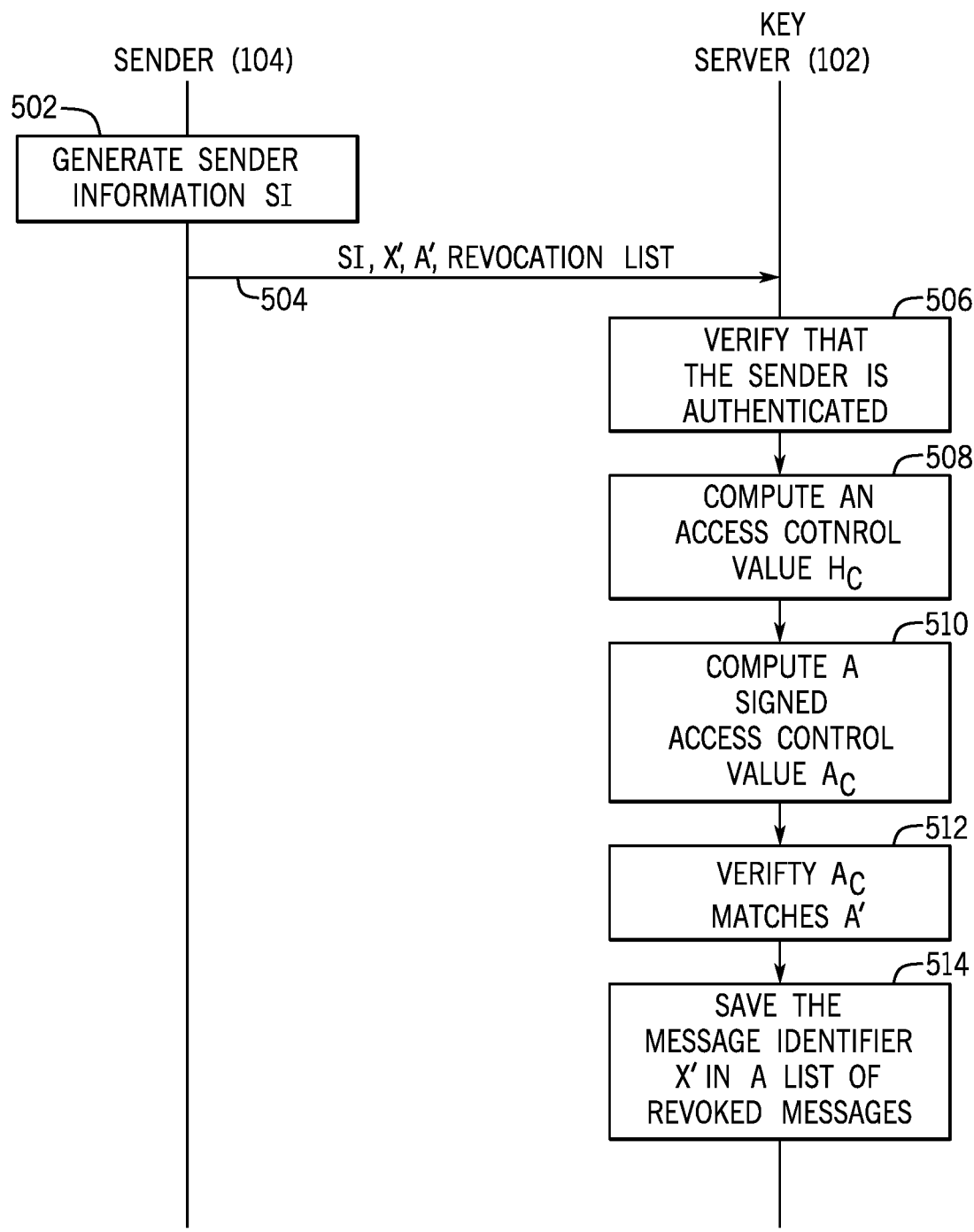
FIGS. 5 and 6 are flow diagrams of processes of revoking messages, according to various examples.

FIG. 5 shows an example of a process performed by the sender 104 and the key server 102 to perform sender-based message revocation, where the sender 102 is to request revocation of receipt of a particular message by all recipients (i.e., no recipients would be able to receive the particular message). The sender 104 generates (at 502) sender information SI. The sender information SI includes the minimal information that can be used by the key server 102 to produce the access control value H, based on the access control binary tree 200 of FIG. 2 or other access control relationship representation. Since the identity of the sender 104 is $I_0$, the sender 104 sends the following information to the key server 102 in association with a message revocation request: $\{I_0, I_1, H_1, H_2\}$. In some examples, the identities $I_0$ and $I_1$ are not hashed so that the server can verify the authenticated sender is $I_0$.

The sender 104 sends (at 504) the following information to the key server 102 in association with the message revocation request: sender information SI, $\{I_0, I_1, H_1, H_2\}$, message identifier X' (of the message that is to be revoked), the signed access control value A'. and a revocation list. Since the message is to be revoked for all recipients, the revocation list can be an empty revocation list. In other examples, instead of sending an empty revocation list, a different indication can be sent by the sender 104 to the key server 102 to indicate the message revocation.

The protection engine 112 in the key server 102 verifies (at 506) that the sender 104 is authenticated and has an identity that matches $I_0$. For example, the connection between the sender 104 and the key server 102 can be a secure connection, such as a TLS connection or SSL connection, in which case the sender 104 would be authenticated based on the sender's ability to establish the secure connection. Alternatively, the sender 104 may have to log into a secure site (such as a secure website) associated with the key server 102 and provide login credentials. This login process can be used to authenticate the sender 104.

If the sender 104 is not authenticated, then the message revocation request can be rejected. However, if the sender 104 is authenticated, then the protection engine 112 computes (at 508) an access control value $H_C$ based on the sender information SI, given the access control binary tree 200 or other access control relationship representation.

The protection engine then computes (at 510) a signed access control value $A_C$ by applying a signing function f3 on a value derived from $H_C$, as follows: $A_C = f3(H_C, X', S)$.

The protection engine 112 verifies (at 512) that the computed signed access control value $A_C$ matches the received signed access control value A' (from the sender 104), by comparing $A_C$ to A'. If $A_C$ matches A', then that is an indication that the sender 104 is authorized to revoke access to the message Assuming that $A_C$ matches A', the protection engine 112 saves (at 514) the message identifier X' in a list (or other data structure) of revoked messages. The list (or other data structure) of revoked messages includes identifiers of messages that have been revoked, i.e., cannot be received by recipients. The key server 102 can use the list (or other data structure) of revoked messages to determine whether a message is revoked, in response to a recipient sending to the key server 102 a key request for a key to decrypt the message (e.g., such as task 408 shown in FIG. 4).

Although not shown, the key server 102 can send an acknowledgement of the message revocation request to the sender 104 to acknowledge that the message has been successfully revoked.

Figure 6:
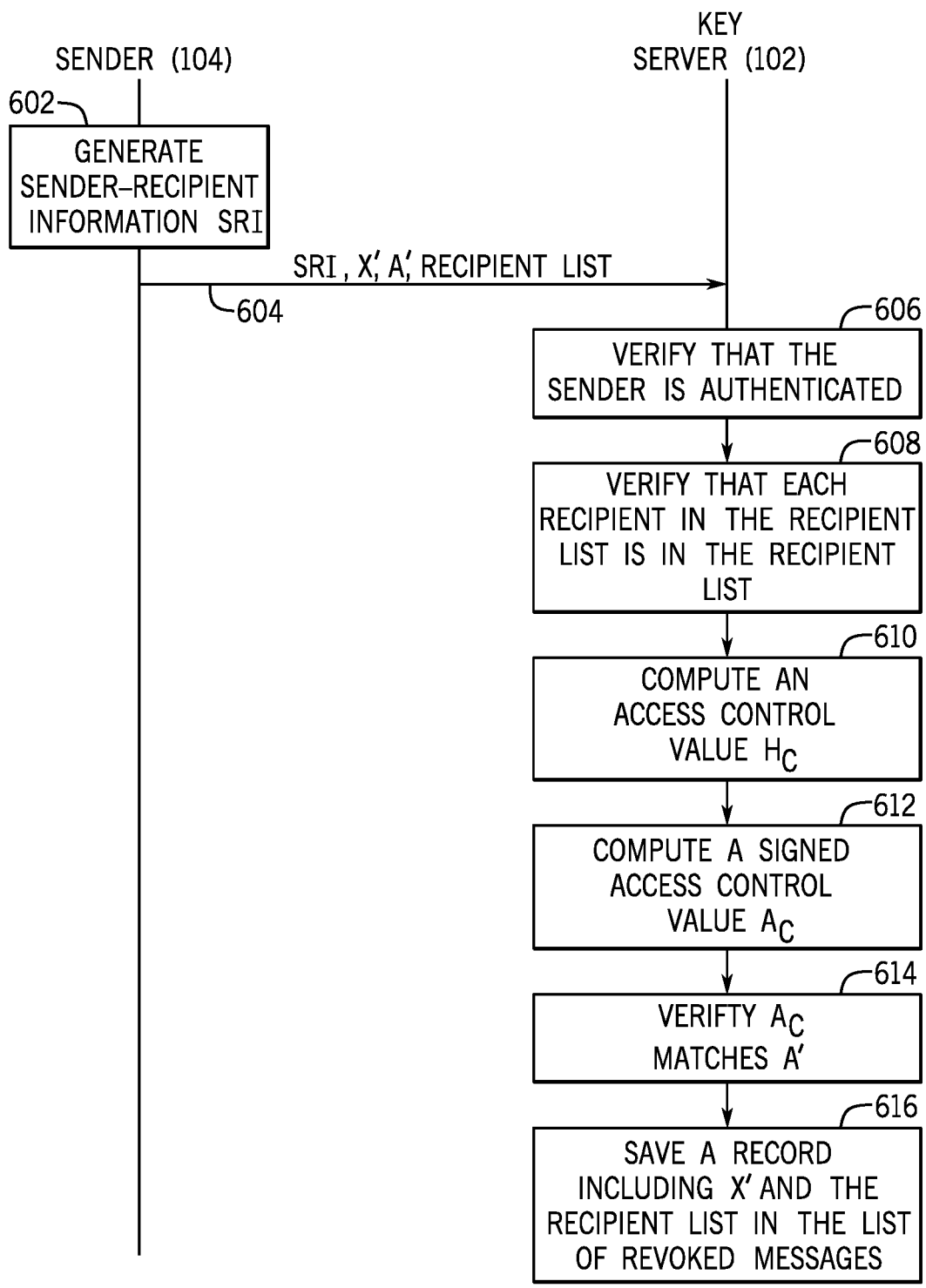

FIG. 6 shows a flow diagram of a process to revoke a message for a specific set of recipients. In FIG. 6, it is assumed that the set of recipients includes just one recipient with identity $I_2$.

The sender 104 computes (at 602) sender-recipient information SRI, which includes the identity of the sender 104 (the entity requesting the message revocation) and the identity (or identities) of the recipients 106 for which a message is to be revoked. In the example of FIG. 6, since there is just one recipient ($I_2$) for which the message is to be revoked, the sender-recipient information SRI includes $\{I_0, I_1, I_2, I_3, H_2\}$, which is the minimal set of information including $I_0$ and $I_2$ that allows the key server 102 to generate the access control value H.

The sender 104 sends (at 604) the following information in association with a message revocation request: SRI, X', A', and recipient list (which in this example includes $I_2$).

The protection engine 112 in the key server 102 verifies (at 606) that the sender 104 is authenticated and has an identity that matches $I_0$.

If the sender 104 is not authenticated, then the message revocation request can be rejected. However, if the sender 104 is authenticated, then the protection engine 112 verifies (at 608) that each identity in the recipient list is in the recipient list sent to the protection engine 112. Alternatively, task 608 can be skipped.

If each identity in the recipient list is not in the recipient list, then the message revocation request is rejected. If each identity in the recipient list is in the recipient list, the protection engine 112 computes (at 610) an access control value $H_C$ based on the sender-receiver information SRI, given the access control binary tree 200 or other access control relationship representation.

The protection engine then computes (at 612) a signed access control value $A_C$ by applying a signing function f3 on a value derived from $H_C$, as follows: $A_C = f3(H_C, X', S)$.

The protection engine 112 verifies (at 614) that the computed signed access control value $A_C$ matches the received signed access control value A' (from the sender 104), by comparing $A_C$ to A'.

Assuming that $A_C$ matches A', the protection engine 112 saves (at 616) a record that includes the message identifier X' and the recipient list in a list (or other data structure) of revoked messages. The record indicates which message is revoked, and for which recipient(s).

Although not shown, the key server 102 can send an acknowledgement of the message revocation request to the sender 104 to acknowledge that the message has been successfully revoked.

The foregoing has provided examples of revoking a message on the basis of recipient identities. In further examples, a message can be revoked based on recipient identities and time. For example, in association with a message revocation request, the sender 104 can send (such as at 604 in FIG. 6) a list of recipients to be revoked, as well as the time at which the revocation is to occur. For example, the message revocation request can specify that the message cannot be accessed by a list of recipients after a certain date and time. As another example, the message revocation request can specify that the message cannot be accessed by any recipient after a certain date and time.

In other examples, instead of the sender 104 requesting revocation of messages according to techniques depicted in FIG. 5 or 6, an administrator, who has access to the key server 102, can perform administrator-based message revocation.

The key server administrator can restrict access to encrypted messages using specified criteria including any or some combination of the following: a criterion to allow a message (or messages) to be read within a date range, a criterion disallowing reading a message (or messages) for a set of recipients, a criterion disallowing reading of any message for a set of recipients, and so forth.

The criterion or criteria specified by the key server administrator is saved by the key server 102 and is used to control revocation of messages.

In alternative examples, instead of using the access control binary tree of FIG. 2 to compute the access control value H based on identities of the sender 104 and the recipients 106, a different access control relationship can be used instead. For example, the access control value can be computed according to the following access control relationship:

$H_0=f1(I_0, " ")$, where the hash function $f1$ is applied on $I_0$ and a null value to produce $H_0$.

$H_1=f1(I_1,H_0)$, where the hash function $f1$ is applied on $I_1$ and $H_0$ to produce $H_1$.

$H_2=f1(I_2,H_1)$.

...

$H=f1(I_{R-1},H_{R-1})$.

With this access control relationship, the recipient information R1 generated at 404 includes the following information, given a recipient with index r in the sorted list of identities of recipients: $I_r, I_{r+1}, \ldots, I_{R-1}$, and $H_{r-1}'$. $H_{r-1}'$ is computed as follows by the recipient with index r:

$H_0'=f1(I_0" ")$.

$H_1'=f1(I_1,H_0')$.

...

$H_{r-1}'=f1(I_{r-1},H_{r-2}')$.

At task 412, the key server 102 computes the access control value $H_C$ as follows:

$H_r'=f1(I_r,H_{r-1}')$.

$H_{r+1}'=f1(I_{r+1},H_r)$.

...

$H_C=f1(I_{R-1},H_{R-1})$.

Figure 7:
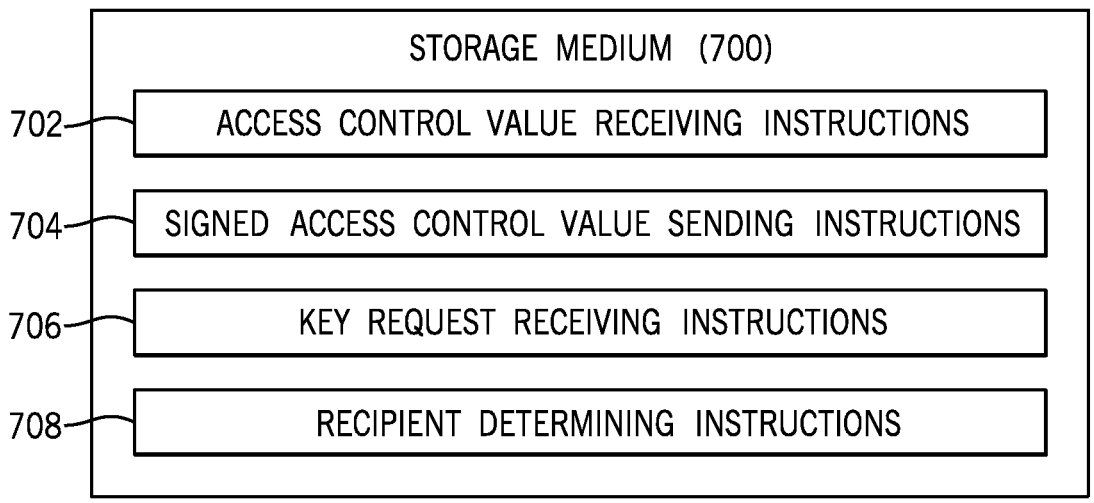
FIG. 7 is a block diagram of a storage medium storing machine-readable instructions according to some examples.

FIG. 7 is a block diagram of a non-transitory machine-readable or computer-readable storage medium 700 that stores machine-readable instructions that upon execution cause a system (such as the key server 102 of FIG. 1) to perform various tasks. The machine-readable instructions of FIG. 7 include access control value receiving instructions 702 to receive, from a sender, an access control value generated based on information of multiple recipients. The machine-readable instructions include signed access control values sending instructions 704 to send, to the sender, a signed version of the access control value for sending by the sender to the multiple recipients with an encrypted message.

The machine-readable instructions further include key request instructions 706 to receive, from a first recipient in association with a request for a key to decrypt the encrypted message, a signed access control value and recipient information for deriving the access control value. The machine-readable instructions further include recipient determining instructions 708 to determine whether the first recipient is one of the multiple recipients using the signed access control value and the recipient information.

Figure 8:
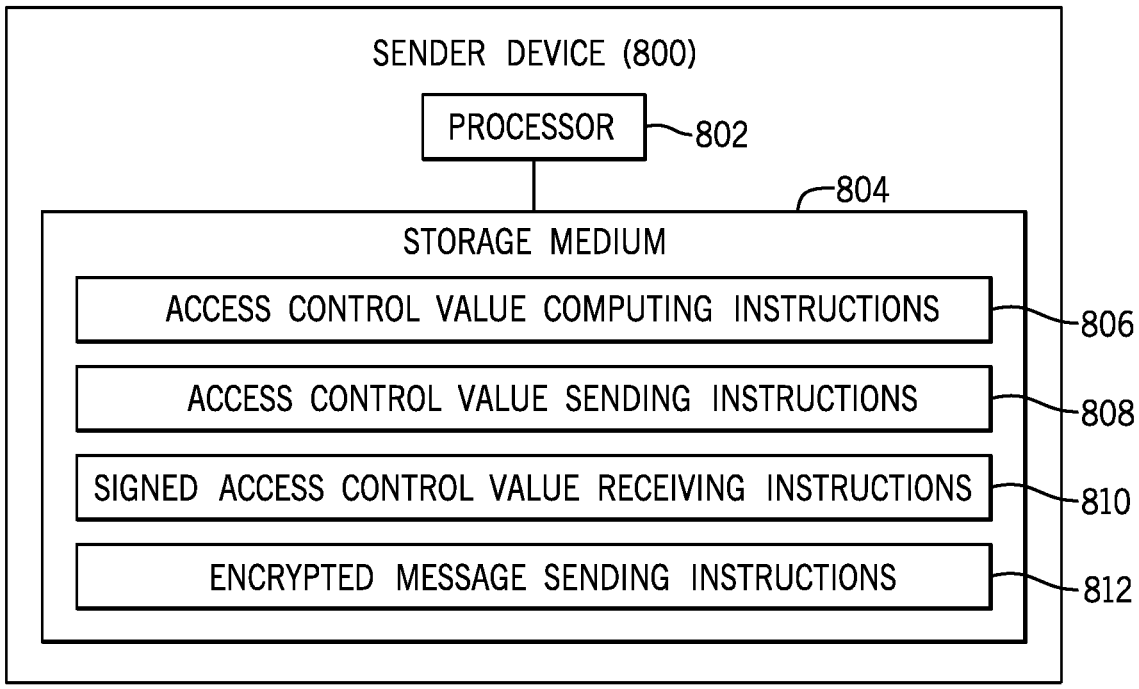
FIG. 8 is a block diagram of a sender device according to some examples.

FIG. 8 is a block diagram of an example sender device 802 according to some implementations. The sender device 800 includes a processor 802 (or multiple processors). The sender device 800 further includes a non-transitory storage medium 804 that stores machine-readable instructions executable on the processor 802 to perform various tasks. Instructions executable on a processor can refer to instructions executable on one processor or on multiple processors.

The storage medium 804 stores access control value computing instructions 806 to compute an access control value from respective recipient information of multiple recipients. The storage medium 804 further stores access control value sending instructions 808 to send, to a key server, the access control value to request a key.

The storage medium 804 further stores signed access control value receiving instructions 810 to receive, from the key server, the key and a signed version of the access control value. The storage medium 804 further stores encrypted message sending instructions to send, to the multiple recipients, a message encrypted with the key and the signed version of the access control value.

Figure 9:
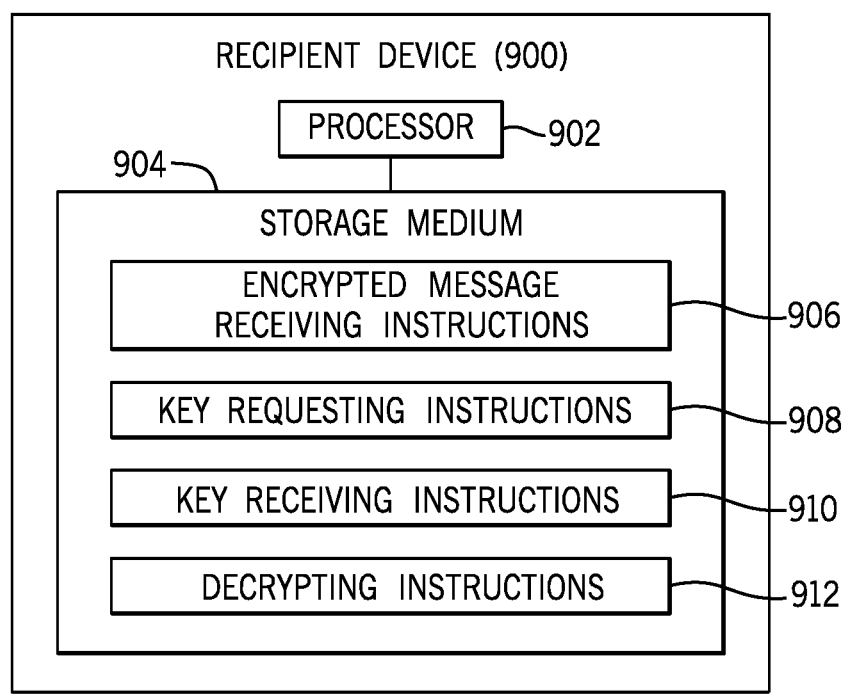
FIG. 9 is a block diagram of a recipient device according to some examples.

FIG. 9 is a block diagram of a recipient device 900 that includes a processor 902 (or multiple processors) and a non-transitory storage medium 904 that stores machine-readable instructions executable on the processor 902.

The storage medium 904 stores encrypted message receiving instructions 906 to receive, from a sender, an encrypted message and a signed access control value that are sent by the sender to multiple recipient devices. The storage medium 904 stores key requesting instructions 908 to request a key from a key server by sending, to the key server, the signed access control value an recipient information usable to derive the access control value.

The storage medium 904 further stores key receiving instructions 910 to receive the key from the key server in response to the key server verifying, using the signed access control value and the recipient information, that the recipient device is one of the multiple recipient devices. The storage medium 904 further stores decrypting instructions 912 to decrypt the encrypted message using the key.

The storage medium 700, 804, or 904 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a system to:
    receive, from a sender, an access control value generated based on information of a plurality of recipients;
    send, to the sender, a signed version of the access control value for sending by the sender to the plurality of recipients with an encrypted message;
    receive, from a first recipient in association with a request for a key to decrypt the encrypted message, a signed access control value and recipient information for deriving the access control value, wherein the recipient information comprises an identity of the first recipient, and an intermediate value computed from information of another of the plurality of recipients; and determine whether the first recipient is one of the plurality of recipients using the signed access control value and the recipient information.

2. The non-transitory machine-readable storage medium of claim 1, wherein the instructions upon execution cause the system to:

send, to the sender, an identifier of the encrypted message;

receive, from the first recipient in association with the request for the key to decrypt the encrypted message, the identifier of the encrypted message; and determine, based on the received identifier of the encrypted message, whether the first recipient is allowed to access the encrypted message.

3. The non-transitory machine-readable storage medium of claim 1, wherein the intermediate value is based on application of a hash function on information of multiple recipients of the plurality of recipients.

4. The non-transitory machine-readable storage medium of claim 1, wherein the access control value is based on a hash function applied on values derived from identities of the plurality of recipients.

5. The non-transitory machine-readable storage medium of claim 1, wherein the access control value is based on hash values computed by applying a hash function on identities of recipients of the plurality of recipients.

6. The non-transitory machine-readable storage medium of claim 5, wherein use of the hash values allows for the recipient information to include a compressed recipient list.

7. The non-transitory machine-readable storage medium of claim 1, wherein the instructions upon execution cause the system to:

compute an access control value based on the recipient information;

compute a signed version of the computed access control value; and compare the computed signed version of the computed access control value to the received signed access control value, to determine whether the first recipient is one of the plurality of recipients.

8. The non-transitory machine-readable storage medium of claim 7, wherein the instructions upon execution cause the system to:

in response to determining that the first recipient is one of the plurality of recipients, send the key to the first recipient for use by the first recipient in decrypting the encrypted message.

9. The non-transitory machine-readable storage medium of claim 7, wherein the instructions upon execution cause the system to:

send the key to the sender for use by the sender in encrypting a message to produce the encrypted message sent by the sender to the plurality of recipients.

10. The non-transitory machine-readable storage medium of claim 1, wherein the instructions upon execution cause the system to:

receive, from the sender, a request to revoke access to the encrypted message, the request to revoke comprising a signed access control value and information useable to compute the access control value;

determine that the sender is authorized to revoke access to the encrypted message based on the signed access control value and the information in the request to revoke; and revoke access to the encrypted message in response to the determining that the sender is authorized to revoke access to the encrypted message.

11. The non-transitory machine-readable storage medium of claim 10, wherein the revoking of the access to the encrypted message comprises revoking access to the encrypted message by all recipients or by a set of recipients.

12. The non-transitory machine-readable storage medium of claim 10, wherein the revoking of the access to the encrypted message comprises revoking access to the encrypted message based on time.

13. A sender device comprising:

a processor; and a non-transitory storage medium storing instructions executable on the processor to:

compute an access control value based on:

applying a hash function on plural subsets of identities of a plurality of recipients, to produce respective intermediate hash values, and applying the hash function on the intermediate hash values for producing the access control value;

send, to a key server, the access control value to request a key;

receive, from the key server, the key and a signed version of the access control value produced based on a signing function applied on the access control value from the sender device; and send, to the plurality of recipients, a message encrypted with the key, and the signed version of the access control value.

14. The sender device of claim 13, wherein the instructions are executable on the processor to:

received, from the key server, an identifier of the message, wherein the signed version of the access control value is produced based on the signing function applied on the identifier of the message and the access control value; and send, to the plurality of recipients, the identifier of the message.

15. The sender device of claim 13, wherein the instructions are executable on the processor to:

send, to the key server, a request to revoke access to the message by at least some of the plurality of recipients, the request to revoke comprising a signed access control value and information for use to compute the access control value.

16. A recipient device comprising:

a processor; and a non-transitory storage medium storing instructions executable on the processor to:

receive, from a sender, an encrypted message and a signed access control value that are for receipt by a plurality of recipient devices from the sender;

to request a key from a key server, send, to the key server, the signed access control value and recipient information for use to derive an access control value, wherein the recipient information includes an identity of the recipient device and a hash value derived from identities of multiple other recipient devices, the signed access control value and the recipient information for use by the key server in verification that the recipient device is one of the plurality of recipient devices;

receive the key from the key server responsive to the verification; and decrypt the encrypted message using the key.

* * * * *